United States Patent [19]

Ozue et al.

[11] Patent Number: 5,157,650
[45] Date of Patent: Oct. 20, 1992

[54] OPTICAL RECORDING APPARATUS

[75] Inventors: Tadashi Ozue; Masahiko Chaya; Tatsuya Narahara, all of Kanagawa, Japan

[73] Assignee: Sony Corporation, Tokyo, Japan

[21] Appl. No.: 746,061

[22] Filed: Aug. 12, 1991

Related U.S. Application Data

[63] Continuation of Ser. No. 339,387, Apr. 17, 1989, abandoned.

[30] Foreign Application Priority Data

Apr. 15, 1988 [JP] Japan ................. 63-91283

[51] Int. Cl.$^5$ ................................. G11B 7/00
[52] U.S. Cl. .................... 369/111; 369/113; 369/44.17
[58] Field of Search ............ 369/112, 111, 114, 44.13, 369/44.17, 97, 44.18, 113; 350/358; 365/123

[56] References Cited

U.S. PATENT DOCUMENTS

| | | | |
|---|---|---|---|
| Re. 31,334 | 8/1983 | Spaulding et al. | 365/123 |
| 3,314,075 | 3/1967 | Becker et al. | 369/97 |
| 3,514,534 | 3/1970 | Korpel | 350/358 |
| 3,531,184 | 9/1970 | Adler | 350/358 |
| 3,885,094 | 5/1975 | Russell | 369/111 |
| 3,935,566 | 1/1976 | Shopko | 365/123 |
| 4,005,275 | 1/1977 | Coppock | 179/100.3 G |
| 4,321,564 | 3/1982 | Tregay | 356/123 |
| 4,449,212 | 5/1984 | Reno | 369/44 |
| 4,449,215 | 5/1984 | Reno | 369/111 |
| 4,661,941 | 3/1987 | Bell et al. | 369/111 |
| 4,807,213 | 2/1989 | Chung et al. | 369/44.18 |

FOREIGN PATENT DOCUMENTS

| | | |
|---|---|---|
| 0008848 | 3/1980 | European Pat. Off. . |
| 0189135 | 7/1986 | European Pat. Off. . |
| 2067338 | 7/1981 | United Kingdom . |

Primary Examiner—Roy N. Envall, Jr.
Assistant Examiner—Nabil Hindi
Attorney, Agent, or Firm—Lewis H. Eslinger; Donald S. Dowden

[57] ABSTRACT

An optical recording apparatus employing a plurality of modulated laser beams as means for recording information on an optical recording medium, comprising a laser beam source which emits a laser beam, a plurality of carrier sources which generate carriers respectively of different frequencies, a plurality of switching circuits respectively connected to the carrier sources to interrupt the carriers intermittently for modulation according to information data signals applied respectively thereto to provide driving signals, an acoustooptic reflector which splits the laser beam into a plurality of discrete laser beam intermittently interrupted respectively according to the driving signals, a focusing lens for focusing the plurality of discrete laser beams on spots on the recording surface of a recording medium, and a polygonal rotating mirror disposed between the acoustooptic deflector and the focusing lens to reflect the plurality of discrete laser beams so as to sweep the recording surface of the recording medium for information recording simultaneously on a plurality of recording tracks on the recording medium.

3 Claims, 4 Drawing Sheets

FIG. I

OPTICAL RECORDING APPARATUS

This is a continuation of application Ser. No. 07/339,387, filed Apr. 17, 1989, now abandoned.

BACKGROUND OF THE INVENTION

1. Field of the Invention

The present invention relates to an optical recording apparatus incorporating an acoustooptic deflector capable of generating a plurality of laser beams by means of an ultrasonic wave to transfer information at a high information transfer speed.

2. Description of the Prior Art

A light beam, particularly, a laser beam, i.e., a beam of coherent light wave, is an optimum medium for high-density information recording and is employed in practical digital information recording apparatus and video signal recording apparatus because a light beam can be focused on a very small spot and can be controlled at a high speed.

Ordinarily, such a recording apparatus employing a laser beam irradiates a photosensitive recording medium with a single laser beam emitted from a laser beam source while the laser beam is controlled in an on-off control mode according to information to be recorded.

Referring to FIG. 4 showing an acoustooptic deflector for controlling a laser beam, there are shown a medium 1 formed of tellurium oxide ($TeO_2$) or a lithium-niobium oxide (LiNiO), an electrode 2 formed on one end of the medium 1, a sonic wave absorbing member 3, an incident laser beam 4 falling on the X-Y plane of the medium 1, the zero-order beam 5 of the incident laser beam 4, and a first-order beam 6 of the incident laser beam 4.

When an alternating signal of a frequency in the range of 40 MHz to 100 MHz is applied to the electrode 2, a density-modulated ultrasonic wave 7 is generated in the medium 1 as indicated by broken lines in FIG. 4. The density-modulated ultrasonic wave 7 changes the refractive index of the medium 1 to form a cubic diffraction grating. Accordingly, when a laser beam of a diameter sufficiently larger than the wavelength of the density-modulated ultrasonic wave 7 falls on the medium 1 in a direction substantially perpendicular to the direction of propagation of the density-modulated ultrasonic wave 7, the density-modulated ultrasonic wave is deflected by diffraction (anisotropic Bragg diffraction) to generate the first-order beam 6.

Generally, the anisotropic Bragg angle at which the first-order beam is generated is approximately in inverse proportion to the wavelength of the density-modulated ultrasonic wave 7 generated in the medium 1 by the alternating signal applied to the electrode 2, and the intensity of the first-order beam is proportional to the power of the alternating signal applied to the electrode 2 within a fixed range of the power. Accordingly, when an alternating signal of a sufficiently high power is applied to the electrode 2, the acoustooptic deflector is able to convert the zero-order beam into the first-order beam at a conversion efficiency in the range of 80% to 90%.

Thus, the output first-order beam of the acoustooptic deflector can be controlled according to information to be recorded by the on-off control of the alternating signal applied to the electrode 2 according to the information.

However, in writing the information on an optical recording medium by controlling the light beam by such an acoustooptic deflector, the transfer speed is limited by a recording speed at which one bit of information is recorded, and hence a high-density recording apparatus is not necessarily a recording apparatus capable of operating at a high transfer speed.

To enable recording at a high transfer speed, there is proposed an optical recording apparatus of a multibeam system employing a semiconductor laser capable of simultaneously generating a plurality of laser beams and capable of controlling the plurality of laser beams to irradiate a single optical recording medium simultaneously by the plurality of laser beams for recording information in the optical recording medium. However, this proposed optical recording apparatus of a multibeam system has a problem that intervals between bits are increased inevitably because the optical recording apparatus must be provided with an optical device for focusing or controlling the plurality of laser beams in a predetermined relation to obviate crosstalk. Moreover, the construction of the optical recording apparatus of a multibeam system is very complicated.

It may be possible to divide a single laser beam into a plurality of laser beams by means of a diffraction grating. However, the individual control of the plurality of laser beams is very difficult.

SUMMARY OF THE INVENTION

Accordingly, it is an object of the present invention to provide an optical recording apparatus employing a single laser beam source and an acoustooptic deflector which receives the output laser beam of the laser beam source, and is capable of dividing the laser beam applied to the acoustooptic deflector into at least two laser beams by applying at least two carriers having different frequencies to the driving electrode of the acoustooptic deflector. The carriers applied to the driving electrode are controlled in an on-off control mode according to information to be recorded. When necessary, the two or more laser beams are caused to sweep in a direction perpendicular to the direction of deflection in irradiating a photosensitive recording medium.

To achieve the object of the invention, the present invention provides an optical recording apparatus comprising a laser beam source which emits a laser beam; an acoustooptic deflector disposed on a path of the laser beam between the laser beam source and a moving recording medium; and a deflection signal source for applying a plurality of deflection signals respectively of different frequencies to the acoustooptic deflector to split the laser beam emitted from the laser beam source into a plurality of laser beams so that the plurality of laser beams are irradiated on the moving recording medium by the acoustooptic deflector respectively according to the corresponding deflection signals.

The laser beam that falls on the acoustooptic deflector is split into a plurality of laser beams differing from each other in anisotropic Bragg angle by the carriers differing from each other in frequency, so that signals of a time series are applied to the optical recording medium. Accordingly, information to be recorded is recorded on a plurality of tracks, and hence a large quantity of information to be recorded can be transferred at a high transfer speed and information recorded in the optical recording medium can be reproduced at a high transfer speed.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
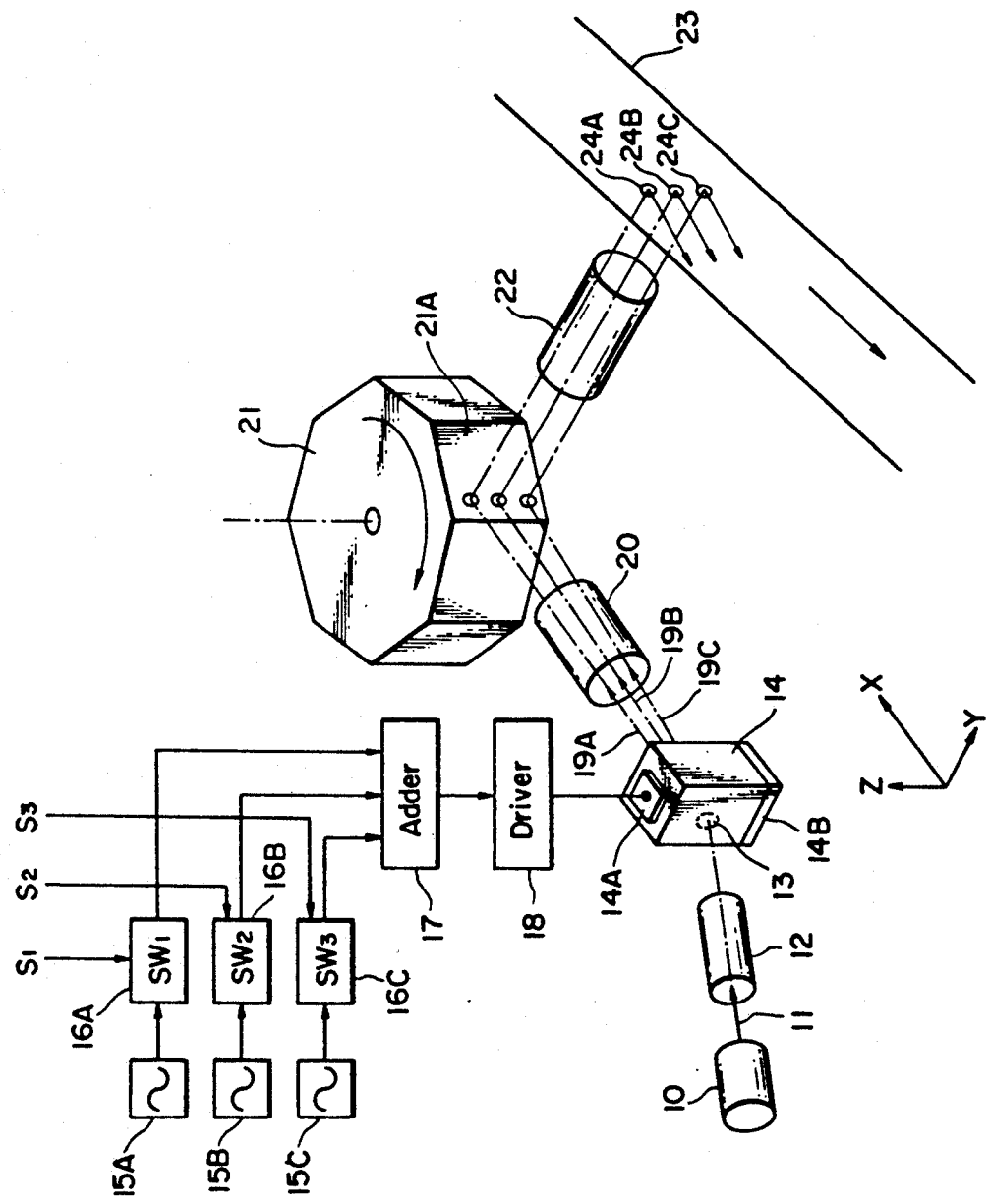
FIG. 1 is a schematic perspective view of assistance in explaining the principle and the arrangement of principal components of an optical recording apparatus in a first embodiment according to the present invention.

An optical recording apparatus in a first embodiment according to the present invention will be described hereinafter with reference to FIG. 1. A laser beam source 10, such as a semiconductor laser or a gas laser emits a laser beam 11. An optical system 12 focuses the laser beam 11 so that the laser beam 11 will fall on an acoustooptic deflector 14 in a spot 13 of a predetermined size.

The optical system 12 comprises a lens (not shown) for focusing the incident laser beam 11 on an elliptic spot 13 having a major axis extending in the direction of propagation of a density-modulated wave, namely, the direction of a Z-axis, within the acoustooptic deflector 14, and an optical device (not shown) having a plane of polarization coinciding with the major axis of the elliptic spot 13.

The electrode 14A of a piezoelectric element, namely, an ultrasonic driving source, is provided on one surface of the acoustooptic deflector 14 perpendicular to the Z-axis, and an ultrasonic wave absorbing member 14B for absorbing a density-modulated wave generated within the acoustooptic deflector 14 is provided on the other surface of the acoustooptic deflector 14 perpendicular to the Z-axis.

Three carrier sources 15A, 15B and 15C generate three carriers respectively of frequencies $f_1$, $f_2$ and $f_3$, respectively. The three carriers generated by the carrier sources 15A, 15B and 15C are applied respectively to switching circuits (modulating circuits) 16A, 16B and 16C. Three data signals $S_1$, $S_2$ and $S_3$ representing information to be recorded are applied respectively to the switching circuits 16A, 16B and 16C.

The output signals of the carrier sources 15A, 15B and 15C are modulated according to the data signals $S_1$, $S_2$ and $S_3$. The modulated data signals are multiplexed by an adder 17, and then a multiple signal is applied to the electrode 14A of the acoustooptic deflector 14. The laser beam 11 is split into three laser beams 19A, 19B and 19C respectively of different Bragg angles respectively corresponding to the frequencies $f_1$, $f_2$ and $f_3$ of the carriers. The three output laser beams 19A, 19B and 19C are collimated by a collimator 20. The three collimated laser beams 19A, 19B and 19C are reflected, when necessary, by a polygonal rotating mirror 21 for sweeping the beams across the record medium. The laser beams 19A, 19B and 19C reflected by the polygonal rotating mirror 21 are focused, by a focusing lens 22, respectively in spots 24A, 24B and 24C on the recording surface 23 of an optical recording tape or an optical disk running at a predetermined speed.

Thus, the laser beam 11 emitted by the laser beam source 10 falls on the acoustooptic deflector 14 in a spot 13 of a predetermined size and shape, and the laser beam 11 is deflected at predetermined Bragg angles by the ultrasonic density-modulated waves forming a cubic diffraction grating within the acoustooptic deflector 14. Since the three density-modulated waves respectively of the different frequencies $f_1$, $f_2$ and $f_3$ are generated in the acoustooptic deflector 14, the laser beam 11 is split into the three laser beams 19A, 19B and 19C respectively of different Bragg angles by the three density-modulated waves of the frequencies $f_1$, $f_2$ and $f_3$. Since the three density modulated waves of the frequencies $f_1$, $f_2$ and $f_3$ are interrupted intermittently according to the three data signals $S_1$, $S_2$ and $S_3$, respectively, information data of three bits are modulated and transferred simultaneously. Accordingly, the three laser beams transfer three different data of three bits in one clock period as shown below, in which blank circles (o) indicate the application of the density-modulated waves to the acoustooptic deflector 14, and crosses (x) indicate the interruption of the density-modulated waves. Thus, the data transfer speed of the optical recording apparatus in the first embodiment according to the present invention is three times that of an optical recording apparatus using a single laser beam.

| $f_1$ | o | o | o | o | x | x | x | x |
|---|---|---|---|---|---|---|---|---|
| $f_2$ | o | o | x | x | o | o | x | x |
| $f_3$ | o | x | o | x | o | x | o | x |

When the acoustooptic deflector 14 is formed of a medium which propagates waves at a comparatively low propagation speed, such as $TeO_2$, the frequencies $f_1$, $f_2$ and $f_3$ are in the range of 40 MHz to 100 MHz. Therefore, the frequency of wave interruption for modulation is at least on the order of 10 MHz, so that the optical recording apparatus is capable of satisfactorily operating to record information represented by signals of high frequencies.

Although the three laser beams 19A, 19B and 19C split and are intermittently interrupted according to the data signals $S_1$, $S_2$ and $S_3$ they may be irradiated directly on the recording surface 23 of an optical recording medium through the collimator 20 and the focusing lens 22, therefore, it is possible to record the information in a high recording density on an optical recording medium, such as an optical recording tape, by reflecting the collimated laser beams 19A, 19B and 19C by the polygonal rotating mirror 21 as shown in FIG. 1 to sweep the surface of the optical recording medium by the three laser beams 19A, 19B and 19C in a direction perpendicular to the direction of deflection of the laser beam 11.

The laser beams 19A, 19B and 19C can be focused on the recording surface 23 of an optical disk or an optical recording tape in spots in the range of 0.5 to 1 μm in diameter by the focusing lens 22 having a numerical aperture on the order of 0.5 to enable the high-density recording of a large number of information bits.

It is desirable to control the respective luminous intensities of the three laser beams substantially at a fixed value regardless of the variation of the data signals $S_1$, $S_2$ and $S_3$ by varying the power of the three carriers applied to the electrode 14A or the output power of the laser beam source 10 according to the mode of intermittent interruption of the data signals $S_1$, $S_2$ and $S_3$. It is possible to increase the recording channels by employing a nonanisotropic acoustooptic deflector as the acoustooptic deflector 14 to increase the number of points of resolution.

An optical recording apparatus in a second embodiment according to the present invention will be described hereinafter with reference to FIG. 2, in which parts like or corresponding to those previously described with reference to FIG. 1 are denoted by the same reference numerals.

Figure 2:
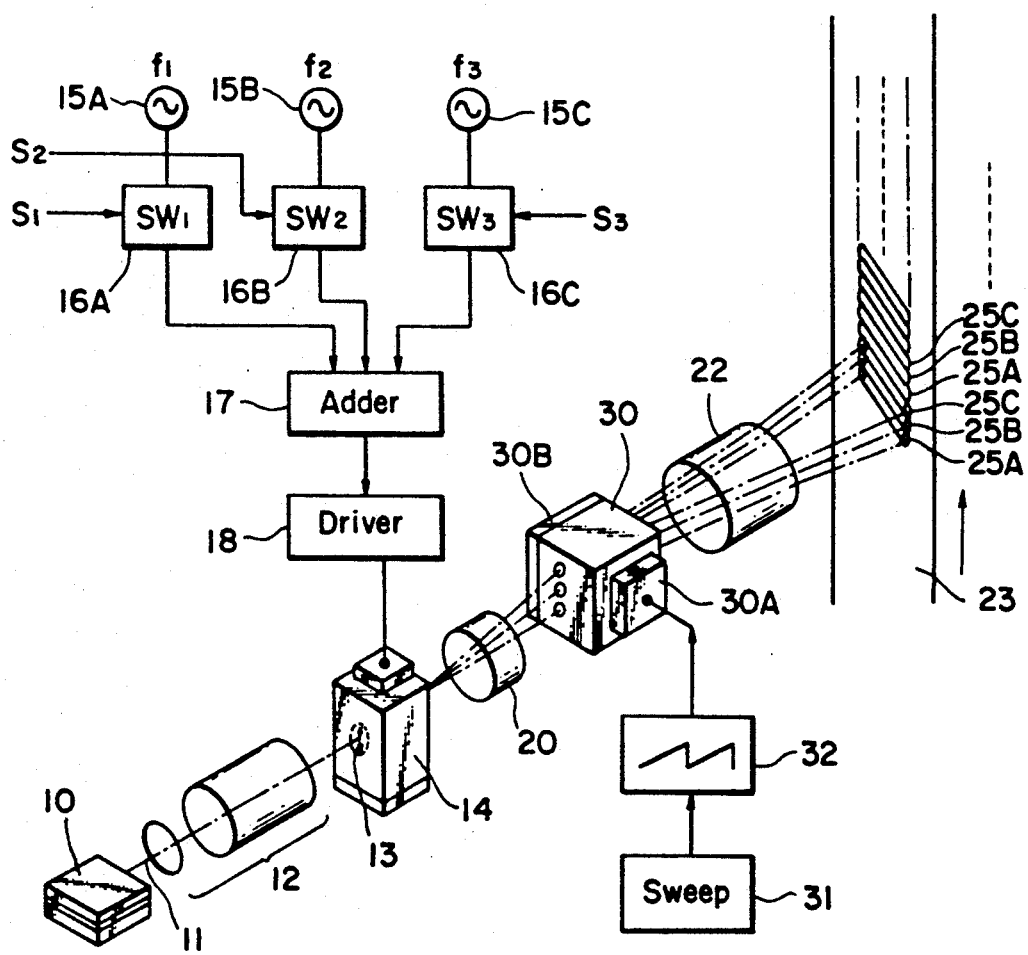
FIG. 2 is a schematic perspective view, similar to FIG. 1, showing the arrangement of principal components of an optical recording apparatus in a second embodiment according to the present invention.

Referring to FIG. 2, the optical recording apparatus is provided with a second acoustooptic deflector 30 for further deflecting the three laser beams deflected by the acoustooptic deflector 14 in a direction perpendicular to the direction of deflection of the acoustooptic deflector 14. The second acoustooptic deflector 30 is provided with an electrode 30A to which a carrier is applied, and a sonic wave absorbing member 30B. The frequency of the carrier applied to the second acoustooptic deflector 30 to form a diffraction grating of an ultrasonic wavelength in the medium of the second acoustooptic deflector 30 is varied continuously by a sweep oscillator 31 and a driving circuit 32. Consequently, the three laser beams falling on the second acoustooptic deflector 30 are caused to sweep in a direction perpendicular to the direction of deflection, and then the three laser beams are focused on recording tracks 25A, 25B, 25C, 25A, . . . formed on the recording surface 23 of a running optical recording tape or the like at an inclination with respect to the longitudinal direction of the optical recording tape.

In the second embodiment, it is preferable to provide the optical system of the collimator 20 with a polarizing device to turn the plane of polarization of the three laser beams falling on the second acoustooptic deflector 30 through a predetermined angle.

In the second embodiment, the acoustooptic deflector 14 may be nonanisotropic and the second acoustooptic deflector 30 may be anisotropic.

An optical recording apparatus in a third embodiment according to the present invention will be described hereinafter with reference to FIG. 3(a), in which parts like or corresponding to those described previously with reference to FIG. 1 are denoted by the same reference numerals.

Figure 3A:
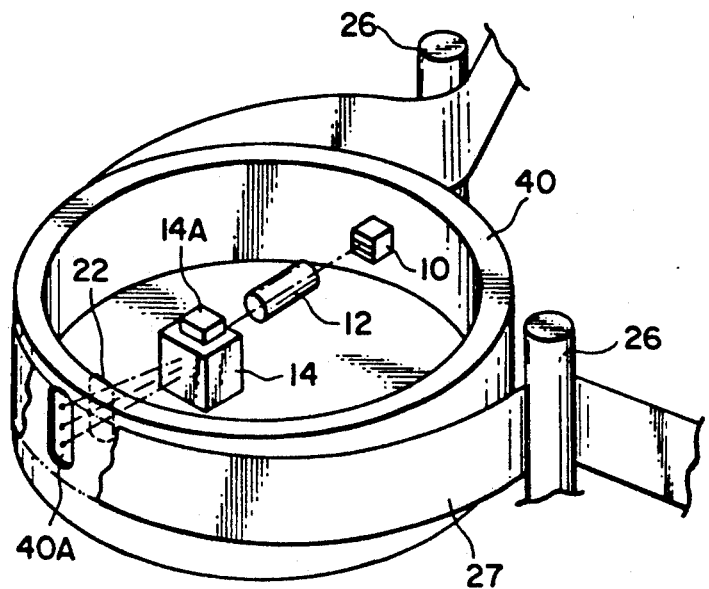
FIGS. 3(a) and 3(b) are a schematic perspective view and a schematic sectional view, respectively, of a rotary scanning drum, showing the arrangement of principal components.

Referring to FIG. 3(a), a laser beam source 10, a collimator 12, an acoustooptic deflector 14 and a focusing lens 22 are disposed within a rotary scanning drum 40 which is rotated by a motor, not shown. Three laser beams split by the acoustooptic deflector 14 are projected outside through the focusing lens 22 and an aperture 40A formed in the circumferential wall of the rotary scanning drum 40.

When an optical recording tape 27 guided by guide posts 26 so as to wrap around the circumference of the rotary scanning drum 40 at a predetermined arc of contact, in a manner similar to that for extending a tape on a VTR of a helical scanning system, is driven running along the circumference of the rotary scanning drum 40, information is recorded on recording tracks inclined with respect to the running direction of the optical recording tape 27 by the three laser beams modulated by data signals at the same transfer speed as that of a VTR of a helical scanning system employing a so-called multihead.

Figure 3B:
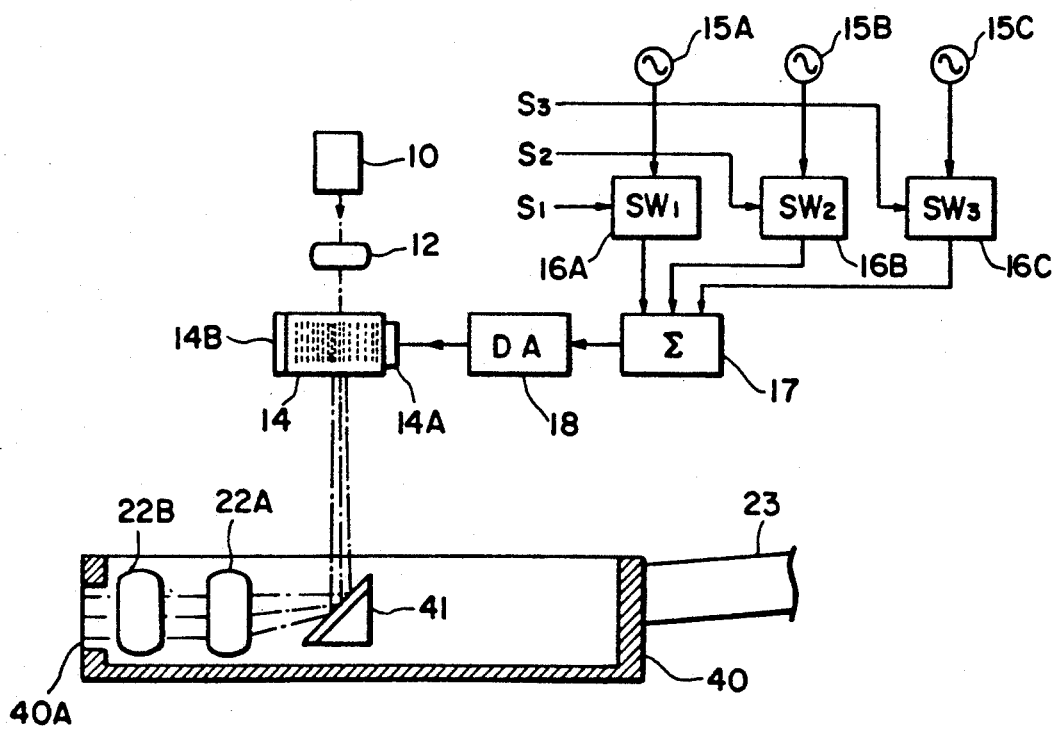
Figure 4:
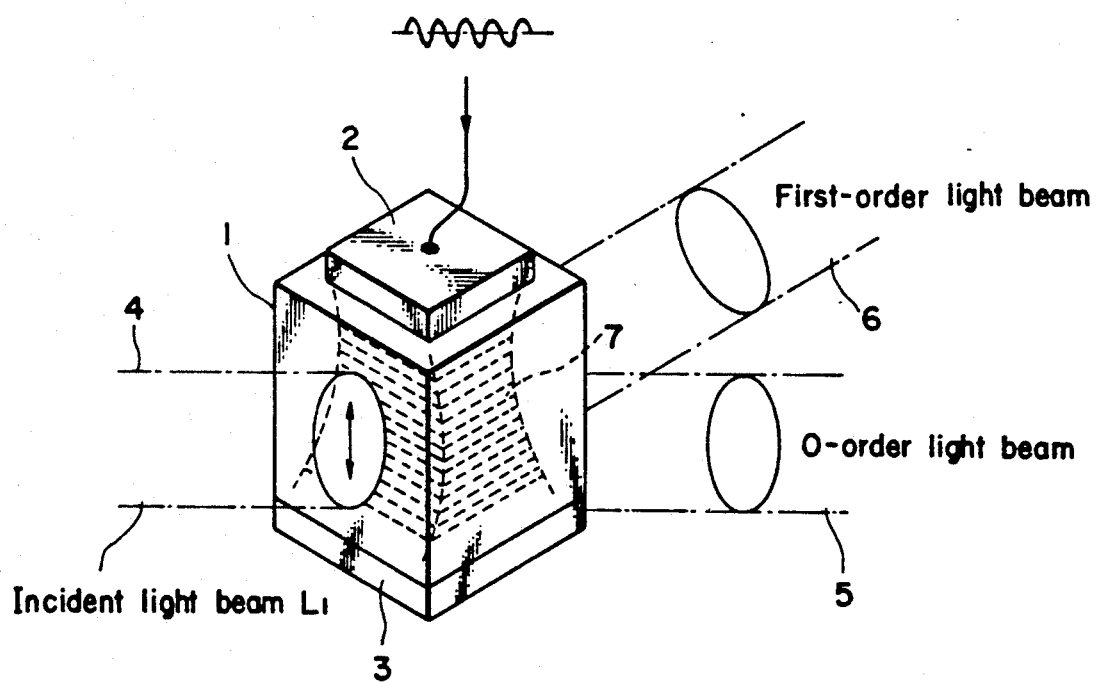
FIG. 4 is a perspective view of an exemplary acoustooptic deflector for deflecting a laser beam.

FIG. 3(b) shows a modification of the optical recording apparatus shown in FIG. 3(a). In this optical recording apparatus, a laser beam source 10, a collimator 12 and an acoustooptic deflector 14 are disposed fixedly above a rotary scanning drum 40. Disposed in the central portion of the rotary scanning drum 40 is a reflecting mirror 41 for reflecting three laser beams falling in the central portion of the rotary scanning drum 40 toward the circumference of the rotary scanning drum 40. The laser beams reflected by the reflecting mirror 41 are collimated by a first lens 22A, and then are focused respectively in minimum spots by a second lens 22B disposed near the aperture 40A of the rotary scanning drum 40. Since the laser beam source 10, the collimator 12 and the acoustooptic deflector 14 are disposed outside the rotary scanning drum 40, those components can be formed in a comparatively large size, which is effective for increasing the laser power for recording.

In the foregoing embodiments, the laser beam is split into the three laser beams by applying the three carriers respectively of different frequencies as driving signals to the acoustooptic deflector to enable the optical recording apparatus to operate at a transfer speed three times that of an optical recording apparatus using a single laser beam. However, the number of the laser beams may be any optional number not less than two and not more than the number N of points of resolution (the number of points of deflection) of the acoustooptic deflector.

As is apparent from the foregoing description, the optical recording apparatus according to the present invention is simple in construction and is capable of recording information at a high transfer speed, since a plurality of carriers respectively of different frequencies intermittently interrupted according to data signals are applied to an acoustooptic deflector of an anisotropic Bragg type to obtain a plurality of laser beams modulated according to the data signals, and information to be recorded is recorded by simultaneously irradiating the plurality of laser beams on an optical recording medium.

Although the invention has been described in its preferred forms with a certain degree of particularity, obviously many changes and variations are possible therein. It is therefore to be understood that the present invention may be practiced otherwise than specifically described herein without departing from the scope and spirit thereof.

What is claimed is:

1. An optical recording apparatus for recording information on a moving record medium, comprising:
    a laser beam source which generates and emits a laser beam;
    a plurality of carrier sources which generate respective carriers of different frequencies;
    a plurality of switching circuits respectively connected to the plurality of carrier sources and to a plurality of information data signals to interrupt the carriers intermittently according to the information data signals applied respectively thereto to provide driving signals;
    acoustooptic deflecting means receiving the driving signals and disposed on a path between the laser beam source and a moving recording medium;
    an optical system mounted between said laser beam source and said acoustooptic deflecting means for focusing on said acoustooptic deflecting means an elliptic spot of said laser beam, said spot having a major axis oriented in a predetermined direction, said acoustooptic deflecting means propagating a density-modulated wave in said predetermined direction in response to said driving signals and splitting said laser beam into a plurality of discrete laser beams intermittently interrupted according to the driving signals applied thereto;

focusing means for focusing the plurality of discrete laser beams from the acoustooptic deflecting means into spots on the moving recording medium to record information represented by the information data signals; and a scanning means disposed on a path between said acoustooptic deflecting means and the moving recording medium to cause the plurality of discrete laser beams to sweep the recording surface of the moving recording medium simultaneously;

wherein said scanning means comprises a rotary scanning drum having an aperture formed in a peripheral surface thereof, and wherein said laser beam source, said acoustooptic deflecting means and said focusing means are disposed within the rotary scanning drum, and the moving recording medium is wrapped around the peripheral surface of the rotary scanning drum.

2. An optical recording apparatus for recording information on a moving record medium, comprising:

a laser beam source which emits a laser beam;

a plurality of carrier sources which generate respective carriers of different frequencies;

a plurality of switching circuits respectively connected to the plurality of carrier sources and to a plurality of information data signals to interrupt the carriers intermittently according to the information data signals applied respectively thereto to provide driving signals;

acoustooptic deflecting means receiving the driving signals and disposed on a path between the laser beam source and a moving recording medium;

an optical system mounted between said laser beam source and said acoustooptic deflecting means for focusing on said acoustooptic deflecting means an elliptic spot of said laser beam, said spot having a major axis oriented in a predetermined direction, said acoustooptic deflecting means propagating a density-modulated wave in said predetermined direction in response to said driving signals and splitting said laser beam into a plurality of discrete laser beams intermittently interrupted according to the driving signals applied thereto;

focusing means for focusing the plurality of discrete laser beams from the acoustooptic deflecting means into spots on the moving recording medium to record information represented by the information data signals; and a scanning means disposed on a path between said acoustooptic deflecting means and the moving recording medium to cause the plurality of discrete laser beams to sweep the recording surface of the moving recording medium simultaneously;

wherein said scanning means comprises a rotary scanning drum having an aperture formed in a peripheral surface thereof, said laser beam source and said acoustooptic deflecting means are high power and disposed outside the rotary scanning drum, said focusing means is disposed near the aperture of the rotary scanning drum, and reflecting means for reflecting the plurality of discrete laser beams toward said focusing means is disposed within the rotary scanning drum.

3. An optical recording apparatus for recording information on a moving record medium, comprising:

a laser beam source which emits a laser beam;

a plurality of carrier sources which generate respective carriers of different frequencies;

a plurality of switching circuits respectively connected to the plurality of carrier sources and to a plurality of information data signals to interrupt the carriers intermittently according to the information data signals applied respectively thereto to provide driving signals;

acoustooptic deflecting means receiving the driving signals and disposed on a path between the laser beam source and a moving recording medium;

an optical system mounted between said laser beam source and said acoustooptic deflecting means for focusing on said acoustooptic deflecting means an elliptic spot of said laser beam, said spot having a major axis oriented in a predetermined direction, said acoustooptic deflecting means propagating a density-modulated wave in said predetermined direction in response to said driving signals and splitting said laser beam into a plurality of discrete laser beams intermittently interrupted according to the driving signals applied thereto;

focusing means for focusing the plurality of discrete laser beams from the acoustooptic deflecting means into spots on the moving recording medium to record information represented by the information data signals; and a scanning means disposed on a path between said acoustooptic deflecting means and the moving recording medium to cause the plurality of discrete laser beams to sweep the recording surface of the moving recording medium simultaneously;

wherein said scanning means comprises second acoustooptic deflecting means disposed in the path of travel of the plurality of discrete laser beams between said acoustooptic deflecting means and the moving recording medium, a sweep oscillator which generates a sweep signal, and a driving circuit which applies a driving signal generated by continuously varying the frequency of the sweep signal generated by the sweep oscillator to the second acoustooptic deflecting means to sweep the recording surface of the recording medium simultaneously by the plurality of discrete laser beams.

* * * * *